US008799648B1

(12) United States Patent
Singh

(10) Patent No.: US 8,799,648 B1
(45) Date of Patent: Aug. 5, 2014

(54) WIRELESS NETWORK CONTROLLER CERTIFICATION AUTHORITY

(75) Inventor: Rajinder Singh, Milpitas, CA (US)

(73) Assignee: Meru Networks, Sunnyvale, CA (US)

( * ) Notice: Subject to any disclaimer, the term of this patent is extended or adjusted under 35 U.S.C. 154(b) by 1243 days.

(21) Appl. No.: 12/191,421

(22) Filed: Aug. 14, 2008

Related U.S. Application Data

(60) Provisional application No. 60/964,908, filed on Aug. 15, 2007.

(51) Int. Cl.
*H04W 12/06* (2009.01)
*H04W 12/08* (2009.01)
*H04L 29/06* (2006.01)

(52) U.S. Cl.
CPC ........... *H04L 63/0823* (2013.01); *H04W 12/06* (2013.01); *H04W 12/08* (2013.01); *H04L 63/10* (2013.01)
USPC ........... 713/156; 370/310; 370/329; 370/338; 455/410; 713/155

(58) Field of Classification Search
CPC ... H04L 63/0823; H04L 63/10; H04W 12/06; H04W 12/08
USPC ........... 713/155, 156; 380/270; 370/338, 310, 370/329; 455/410
See application file for complete search history.

(56) References Cited

U.S. PATENT DOCUMENTS

| | | | |
|---|---|---|---|
| 5,038,151 A | 8/1991 | Kaminski | |
| 5,337,397 A | 8/1994 | Lebby et al. | |
| 5,884,272 A * | 3/1999 | Walker et al. | 705/319 |
| 5,966,094 A | 10/1999 | Ward et al. | |
| 6,035,402 A * | 3/2000 | Vaeth et al. | 726/2 |
| 6,154,461 A * | 11/2000 | Sturniolo et al. | 370/401 |
| 6,463,534 B1 * | 10/2002 | Geiger et al. | 713/168 |
| 6,658,047 B1 | 12/2003 | Komulainen et al. | |
| 6,760,318 B1 | 7/2004 | Bims | |
| 6,788,658 B1 | 9/2004 | Bims | |
| 6,839,038 B2 | 1/2005 | Weinstein | |
| 6,894,649 B2 | 5/2005 | Ostervall | |
| 6,933,909 B2 | 8/2005 | Theobold | |
| 6,954,177 B2 | 10/2005 | Channabasappa et al. | |
| 6,978,158 B2 | 12/2005 | Ghavami | |
| 7,096,359 B2 * | 8/2006 | Agrawal et al. | 713/168 |
| 7,319,685 B2 | 1/2008 | Kim et al. | |
| 7,333,455 B1 | 2/2008 | Bolt et al. | |
| 7,359,362 B2 | 4/2008 | King et al. | |
| 7,386,726 B2 * | 6/2008 | Gehrmann et al. | 713/175 |

(Continued)

OTHER PUBLICATIONS

Habib et al. "Multi-antenna techniques for OFDM based WLAN." Proceedings of First International Conference on Next-Generation Wireless Systems, Jan. 2006, pp. 186-190.

(Continued)

*Primary Examiner* — Zachary A Davis
*Assistant Examiner* — Feliciano Mejia
(74) *Attorney, Agent, or Firm* — Law Office of Dorian Cartwright

(57) ABSTRACT

A controller for a wireless network includes processing elements, an interface for communication with access points for the wireless network, and an interface to another network. The processing elements oversee communication between that other network and the access points, and the controller acts as a certification authority for authenticating access points using public key techniques.

12 Claims, 2 Drawing Sheets

(56) References Cited

U.S. PATENT DOCUMENTS

| | | | |
|---|---|---|---|
| 7,409,551 B2* | 8/2008 | Fujishiro et al. | 713/171 |
| 7,453,855 B1 | 11/2008 | Madhow | |
| 7,473,995 B2* | 1/2009 | Rumer et al. | 257/707 |
| 7,644,270 B1* | 1/2010 | Cherukumudi et al. | 713/156 |
| 7,843,900 B2* | 11/2010 | Gallagher et al. | 370/352 |
| 2001/0034708 A1* | 10/2001 | Walker et al. | 705/51 |
| 2002/0056050 A1* | 5/2002 | Heiden et al. | 713/201 |
| 2002/0085719 A1* | 7/2002 | Crosbie | 380/248 |
| 2002/0124169 A1* | 9/2002 | Agrawal et al. | 713/168 |
| 2002/0133716 A1* | 9/2002 | Harif | 713/201 |
| 2002/0186845 A1* | 12/2002 | Dutta et al. | 380/247 |
| 2003/0014629 A1* | 1/2003 | Zuccherato | 713/156 |
| 2003/0031320 A1* | 2/2003 | Fan et al. | 380/255 |
| 2003/0088772 A1* | 5/2003 | Gehrmann et al. | 713/175 |
| 2003/0097592 A1* | 5/2003 | Adusumilli | 713/201 |
| 2003/0154274 A1* | 8/2003 | Nakamura | 709/223 |
| 2003/0163685 A1* | 8/2003 | Paatero | 713/155 |
| 2003/0163700 A1* | 8/2003 | Paatero | 713/175 |
| 2003/0198305 A1 | 10/2003 | Taylor et al. | |
| 2004/0185842 A1* | 9/2004 | Spaur et al. | 455/420 |
| 2004/0209615 A1* | 10/2004 | Lamb et al. | 455/433 |
| 2004/0243846 A1* | 12/2004 | Aboba et al. | 713/201 |
| 2004/0268142 A1* | 12/2004 | Karjala et al. | 713/200 |
| 2005/0058112 A1* | 3/2005 | Lahey et al. | 370/338 |
| 2005/0060576 A1* | 3/2005 | Kime et al. | 713/201 |
| 2005/0111405 A1 | 5/2005 | Kanterakis | |
| 2005/0138400 A1* | 6/2005 | Wu et al. | 713/189 |
| 2005/0144439 A1* | 6/2005 | Park et al. | 713/155 |
| 2005/0152314 A1 | 7/2005 | Sun et al. | |
| 2005/0171720 A1* | 8/2005 | Olson et al. | 702/121 |
| 2005/0191990 A1* | 9/2005 | Willey et al. | 455/411 |
| 2005/0223111 A1* | 10/2005 | Bhandaru et al. | 709/236 |
| 2006/0015731 A1* | 1/2006 | Lakshmi Narayanan | 713/176 |
| 2006/0023887 A1* | 2/2006 | Agrawal et al. | 380/277 |
| 2006/0116170 A1* | 6/2006 | Brahmbhatt et al. | 455/560 |
| 2006/0133414 A1* | 6/2006 | Luoma et al. | 370/466 |
| 2006/0133612 A1* | 6/2006 | Abedi et al. | 380/270 |
| 2006/0135121 A1* | 6/2006 | Abedi et al. | 455/410 |
| 2006/0171540 A1* | 8/2006 | Lee et al. | 380/277 |
| 2006/0174106 A1* | 8/2006 | Bell et al. | 713/156 |
| 2006/0187871 A1* | 8/2006 | Jones | 370/328 |
| 2006/0193284 A1* | 8/2006 | Stieglitz et al. | 370/328 |
| 2006/0200862 A1* | 9/2006 | Olson et al. | 726/23 |
| 2006/0258366 A1* | 11/2006 | Oki et al. | 455/456.1 |
| 2007/0098176 A1* | 5/2007 | Song | 380/279 |
| 2007/0140191 A1* | 6/2007 | Kojima | 370/338 |
| 2007/0180494 A1* | 8/2007 | Casey et al. | 726/2 |
| 2007/0195742 A1* | 8/2007 | Erdman et al. | 370/338 |
| 2007/0198848 A1* | 8/2007 | Bjorn | 713/186 |
| 2007/0206537 A1* | 9/2007 | Cam-Winget et al. | 370/331 |
| 2007/0286143 A1* | 12/2007 | Olson et al. | 370/338 |
| 2008/0072292 A1* | 3/2008 | Narjala | 726/4 |
| 2008/0082830 A1* | 4/2008 | Goulet | 713/177 |
| 2008/0101291 A1* | 5/2008 | Jiang et al. | 370/331 |
| 2008/0130596 A1* | 6/2008 | Kalhan | 370/338 |
| 2008/0170699 A1* | 7/2008 | Fratti et al. | 380/278 |
| 2008/0186882 A1* | 8/2008 | Scherzer et al. | 370/310 |
| 2009/0134215 A1* | 5/2009 | Drummond et al. | 235/379 |
| 2010/0306170 A1* | 12/2010 | Freedman et al. | 707/621 |

OTHER PUBLICATIONS

Kitahara et al. "A base station adaptive antenna for downlink transmission in a DS-CDMA system." IEEE 51st Vehicular Technology Conference Proceedings, 2000. (Abstract).

Mahler et al. "Design and optimisation of an antenna array for WiMAX base stations." IEEE/ACES International Conference on Wireless Communications and Applied Computational Electromagnetics, 2005. (Abstract).

Miaris et al. "On the base stations antenna system design for mobile communications." Electrical Engineering, 2006, pp. 157-163, vol. 88.

Miura et al. "Study of array pattern tuning method using hybrid genetic algorithms for figure-8 satellite's earth station antenna." Asia-Pacific Microwave Conference Proceedings, 2000. (Abstract).

Ponnapalli et al. "Design and packaging of antennas for wireless systems." Proceedings of Electrical Performance of Electrical Packaging, 1995. (Abstract).

Sarolic. "Base station antenna near-field radiation pattern distortion analysis." Sixth International Conference on Computational Methods for the Solution of Electrical and Electromagnetic Engineering Problems Incorporating Electromagnetic Effects on Human Beings and Equipment Seminar, 2003. (Abstract).

* cited by examiner

WIRELESS NETWORK CONTROLLER CERTIFICATION AUTHORITY

CROSS REFERENCE TO RELATED APPLICATION

This application claims priority to U.S. Provisional Application No. 60/964,908, filed Aug. 15, 2007 in the name of the same inventor, titled "Wireless Network Controller Certification Authority".

BACKGROUND OF THE INVENTION

1. Field of the Invention

This invention relates to implementing public key infrastructure (PKI) in wireless networks, for example but not limited to IEEE 802.11 networks.

2. Related Art

Public key encryption uses a pair of keys, one public and one private, to protect data and information from unauthorized access. Data or information encrypted with the public key can be decrypted only with the corresponding private key. In addition, public key encryption can be used to authenticate devices and/or parties involved in a communication.

One issue in public key encryption is verifying that a public key is authentic, that is it has not been tampered with or replaced by a malicious third party. A public key infrastructure can be used to address this issue. In a public key infrastructure, one or more trusted certification authorities (CAs) certify ownership of key pair (i.e., a public key and its associated private key). Once trusted, encryption and authentication using that key pair can be trusted.

FIG. 2 shows this arrangement in the context of a convention wireless network (e.g., a conventional IEEE 802.11 network): In this arrangement, wireless devices (not shown) communicate with access points (AP1, AP2, ... APN) 20, 21 and 22, which in turn communicate with controller 24. The controller provides access to another network such as a VPN, Intranet, the Internet, the World Wide Web, or the like (not shown). XYZ certification authority 26 issues certificates 28, 29, 30 and 31 that certify ownership of key pairs, as described above.

One problem with this arrangement is that the controller does not have complete control over the certification process. In particular, XYZ certification authority 26 has control of the certificates used in the process (XYZ denoting a third party who owns/controls the certification authority). Another problem is that an infrastructure must be put in place to support the external certification authority.

SUMMARY OF THE INVENTION

Briefly, the controller in a wireless network acts as a certification authority (CA).

In one embodiment, a controller for a wireless network includes processing elements, an interface for communication with access points for the wireless network, and an interface to another network. The processing elements oversee communication between that other network and the access points, and the controller acts as a certification authority for authenticating access points using public key techniques.

In another embodiment, a public key infrastructure for a communication network includes a controller and access points for wireless communication. The controller acts as a certification authority with respect to the access points.

Yet another embodiment is a certification authority for authentication of access points for a wireless network, with the certification authority implemented by a controller associated with the access points.

Preferably, the wireless network is an IEEE 802.11 network, although this need not be the case.

This brief summary has been provided so that the nature of the invention may be understood quickly. A more complete understanding of the invention may be obtained by reference to the following description of the preferred embodiments thereof in connection with the attached drawings.

DESCRIPTION OF THE INVENTION

Architecture

In more detail, in order to have stricter control over what entities a controller should trust, the controller can also assume the role of a certification authority and issue certificates to the access points so that it trusts only the APs that have certificates issued by the controller's "local CA." This way, the controller can refuse access to any access points that have certificates issued by any other CAs. Alternatively, the controller could allow access to access points that have certificates issued by other CAs.

Figure 1:
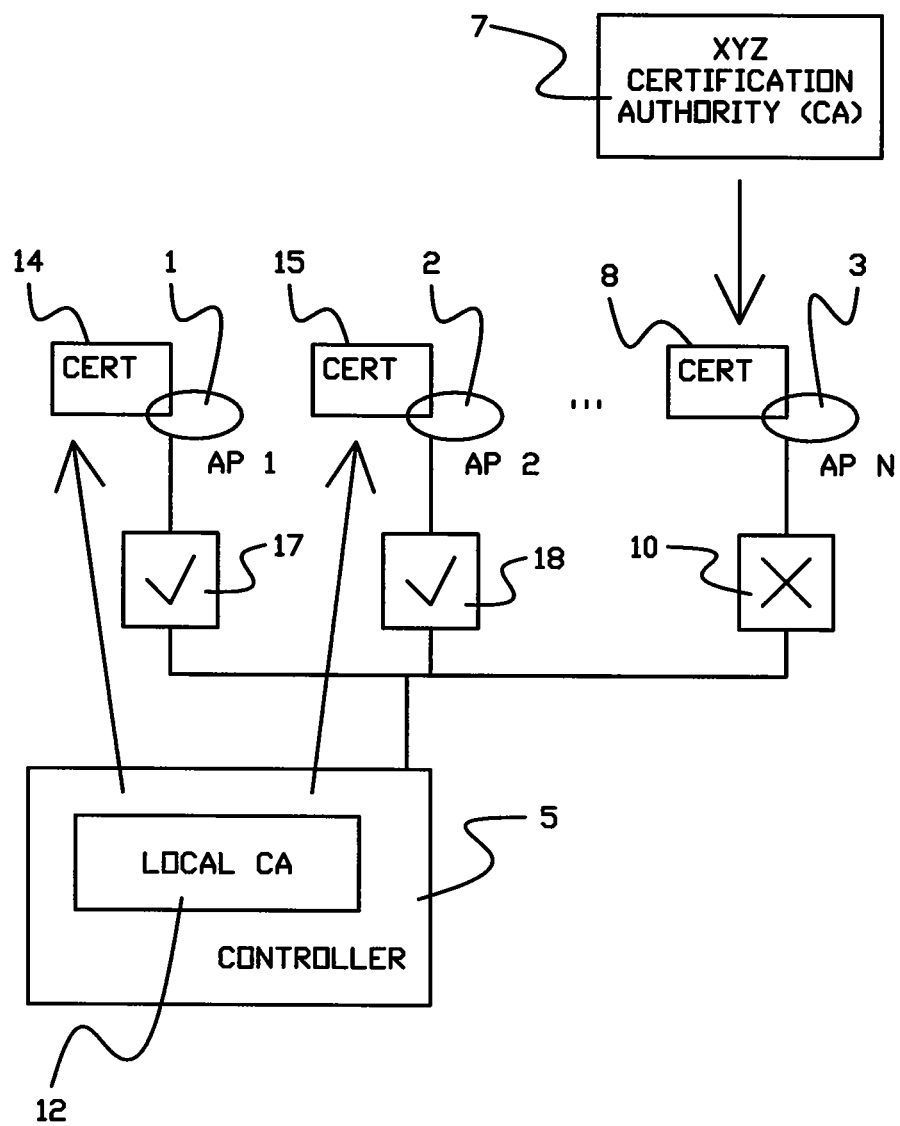
FIG. 1 shows a system that includes a controller and local certification authority according to an embodiment of the invention.
Figure 2:
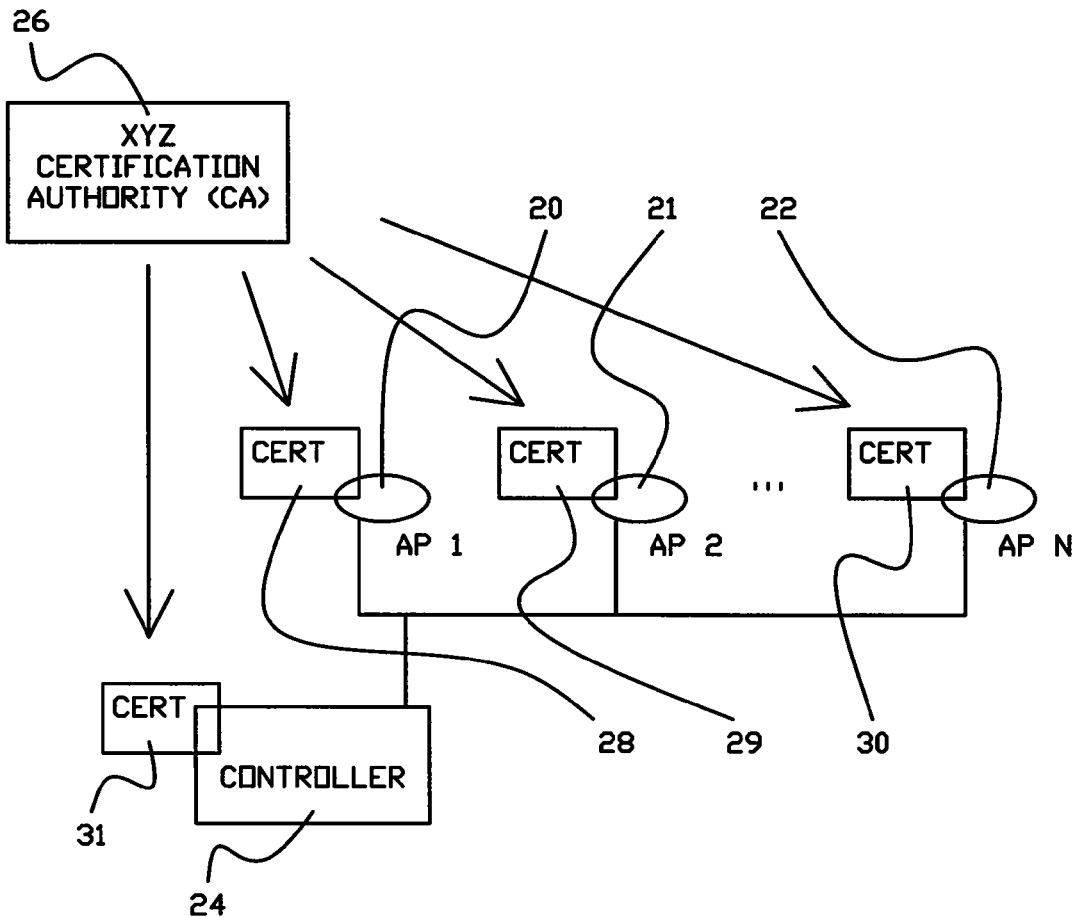
FIG. 2 shows a system that performs certification according to the prior art.

FIG. 1 shows an example of this arrangement.

Wireless devices (not shown) communicate with access points (AP1, AP2, ... APN) 1, 2 and 3, which in turn communicate with controller 5. Preferably, the wireless network used by the access points is an IEEE 802.11 network, although this need not be the case.

The controller provides access to another network such as a VPN, Intranet, the Internet, the World Wide Web, or the like (not shown). XYZ certification authority (CA) 7 issues certificate 8 to APN 3. Controller 5 does not honor this certificate, as shown by the X in box 10. In an alternative embodiment, controller 5 could honor the certificate.

Local certification authority (CA) 12 in and/or controlled by controller 5 issues certificates 14 and 15 to access points (AP 1 and AP 2) 1 and 2. Of course, the invention is not limited to issuing two certificates to two access points. These certificates certify ownership of key pairs for communication between the controller and the access points, permitting secure communication as illustrated by checks in boxes 17 and 18.

The invention is not limited to the arrangement shown in FIG. 1.

In some embodiment, the controller can be configured to allow access to APs that have certificates issued only by that controller's local CA. In that case, the controller preferably always verifies the access point's identity by verifying AP's certificate and making sure that it was signed using controller's own local CA. In other words, a strict authentication/authorization policy can be created between the controllers and access points based on the controller's "local CA" setup. Any rogue access points can thus be restricted from doing anything in the network.

There are many possible advantages to this approach:

Without having to rely on any external CA, the controllers can use their own CA setup to establish trust relationships with other entities.

This process will also eliminate or at least reduce the need to have or manage an extensive PKI setup.

Setup

In preferred embodiments, a controller's "local CA" will not be a provisioned CA. Instead, it will be created during the initial setup. This process will help to insure that a controller's CA is unique in any network setup. Preferably, the CA information will be preserved when controller upgrades are performed.

Alternatively, a controller's local CA can be a provisioned CA. Other techniques for implementing the local CA can also be used.

Various access points (or other clients, e.g. admin users) preferably can request a Client certificate from a controller. In one embodiment, the controller does the following steps to create a client certificate:

Creates a key-pair

Creates a Certificate Signing Request (CSR). For example, a certificate under the X.509 v3 standard, including version, serial number, algorithm id, issuer, validity, not valid before, not valid after, subject identification, subject public key information, public key algorithm, subject public key, issuer unique identifier (optional), subject unique identifier (optional), and extensions (optional), where subject is the target ap for the certificate. Other types of PKI certificates can be used.

Signs the certificate (signing performed by the local CA)

Creates a file to hold the certificate. For example, a PKCS#12 file (Personal Information Exchange Syntax Standard) can be used containing the certificate, corresponding private key, and the local CA public certificate. Alternatively, another file format can be used.

Exports the file to be installed on the access point (or any other client).

The invention also encompasses other techniques for setting up a certification authority (CA) in a controller for public-key encrypted communication with access points for a wireless network such as, but not limited to, and IEEE 802.11 network.

A controller's local CA can also certify key pairs for encrypted communication with an access point, with a device through an access point, or for any other communication that involves the controller and an authenticated access point.

Generality of Invention

The invention can be embodied in a method for a controller in a wireless network to act as a certification authority (CA), as well as in software and/or hardware such as a controller that implements the method, and in various other embodiments.

The invention also is applicable to non-wireless networks (e.g., wired or fiber optic networks) in which a controller is associated with access points.

In the preceding description, a preferred embodiment of the invention is described with regard to preferred process steps and data structures. However, those skilled in the art would recognize, after perusal of this application, that embodiments of the invention may be implemented using one or more general purpose processors or special purpose processors adapted to particular process steps and data structures operating under program control, that such process steps and data structures can be embodied as information stored in or transmitted to and from memories (e.g., fixed memories such as DRAMs, SRAMs, hard disks, caches, etc., and removable memories such as floppy disks, CD-ROMs, data tapes, etc.) including instructions executable by such processors (e.g., object code that is directly executable, source code that is executable after compilation, code that is executable through interpretation, etc.), and that implementation of the preferred process steps and data structures described herein using such equipment would not require undue experimentation or further invention.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

What is claimed is:

1. A method in a controller of a wireless communication network, the method comprising the steps of:
    connecting to one or more first access points of a first wireless network, each access point including a hardware processor and routing messages to and from a set of mobile devices;
    connecting to a second wireless network including a second set of access points, each of the second set of access points including a hardware processor;
    selecting, for at least one of the set of mobile devices, one of the second set of access points for exchanging messages with, and routing messages on behalf of, the at least one of the set of mobile devices;
    issuing, from a certification authority of the controller, certificates of key ownership with respect to authentication of the one or more first access points in order to communicate with the second set of access points; and
    determining whether to allow messages between the one or more first access points and the second set of access points in response to the certificates.

2. The method of claim 1, further comprising:
    receiving a connection request from a rogue access point; and
    refusing access to the rogue access point in response to the rogue access point failing to present a certificate issued by the controller.

3. The method of claim 1, wherein said controller determines whether to allow said messages between particular ones of said mobile stations and particular ones of said access points.

4. The method of claim 1, wherein the second wireless network is disposed to operate under control of one or more devices distinct from said controller.

5. A method, in an access point of a wireless communication network, the method comprising the steps of:
routing messages to and from a set of mobile devices using one or more access points in a first wireless network;
receiving a certificate of key ownership with respect to authentication from a controller including a hardware processor and having a certification authority coupled to the first wireless network and to a second wireless network including a set of second access points, wherein the controller selects, for each of the set of mobile devices, one of said access points for exchanging messages with, and routing messages on behalf of, each of the mobile devices,
wherein the controller determines whether to allow messages between the access points and at least one of the set of second access points, in response to the certificate issued by the certification authority.

6. The method of claim 5, further comprising:
receiving a connection request from a rogue access point; and
refusing access to the rogue access point in response to the rogue access point failing to present a certificate issued by the controller.

7. The method of claim 5, including steps of:
allowing access only between selected particular ones of said mobile stations and selected particular ones of said access points.

8. The method of claim 5, wherein the second wireless network is disposed to operate under control of one or more devices distinct from said controller.

9. A non-transitory computer-readable medium including one or more instructions executable by a controller with a hardware processor to perform a method, the method comprising the steps of:
connecting to one or more first access points of a first wireless network, each access point including a hardware processor and routing messages to and from a set of mobile devices;
connecting to a second wireless network including a second set of access points, each of the second set of access points including a hardware processor;
selecting, for at least one of the set of mobile devices, one of the second set of access points for exchanging messages with, and routing messages on behalf of, the at least one of the set of mobile devices;
issuing, from a certification authority of the controller, certificates of key ownership with respect to authentication of the one or more first access points in order to communicate with the second set of access points; and
determining whether to allow messages between the one or more first access points and the second set of access points in response to the certificates.

10. The computer-readable medium of claim 9, wherein the method further comprises the steps of:
receiving a connection request from a rogue access point; and
refusing access to the rogue access point in response to the rogue access point failing to present a certificate issued by the controller.

11. The computer-readable medium of claim 9, wherein said instructions direct said access points to allow access to selected particular ones of said mobile stations, in response to said certificates.

12. The computer-readable medium of claim 9, wherein the second wireless network is disposed to operate under control of one or more devices distinct from said controller.

* * * * *